US012022584B2

United States Patent
Arfan et al.

(10) Patent No.: US 12,022,584 B2
(45) Date of Patent: Jun. 25, 2024

(54) APPARATUS, METHOD FOR CALIBRATING AN APPARATUS AND DEVICE THEREFOR

(71) Applicant: Siemens Healthcare Diagnostics Inc., Tarrytown, NY (US)

(72) Inventors: Mohammed Arfan, Bangalore (IN); Sudipa Bhattacharya, Bangalore (IN)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 17/997,162

(22) PCT Filed: Apr. 26, 2021

(86) PCT No.: PCT/US2021/029137
§ 371 (c)(1),
(2) Date: Oct. 26, 2022

(87) PCT Pub. No.: WO2021/222090
PCT Pub. Date: Nov. 4, 2021

(65) Prior Publication Data
US 2023/0276551 A1    Aug. 31, 2023

Related U.S. Application Data

(60) Provisional application No. 63/018,114, filed on Apr. 30, 2020.

(51) Int. Cl.
*H05B 45/24* (2020.01)
*H05B 45/22* (2020.01)
*H05B 45/50* (2022.01)

(52) U.S. Cl.
CPC ............ *H05B 45/24* (2020.01); *H05B 45/22* (2020.01); *H05B 45/50* (2020.01)

(58) Field of Classification Search
None
See application file for complete search history.

(56) References Cited

U.S. PATENT DOCUMENTS

| | | |
|---|---|---|
| 7,016,053 B2 | 3/2006 | Moriuchi et al. |
| 7,065,236 B2 | 6/2006 | Marcelpoil et al. |
| (Continued) | | |

FOREIGN PATENT DOCUMENTS

| | | |
|---|---|---|
| CN | 102209246 A | 10/2011 |
| EP | 1428016 A2 | 6/2004 |
| (Continued) | | |

OTHER PUBLICATIONS

International Search Report and Written Opinion of International Application No. PCT/US2021/029137 dated Aug. 4, 2021.

(Continued)

*Primary Examiner* — Anh Q Tran (57) ABSTRACT

An apparatus, a method and a device for calibrating the apparatus is disclosed. The apparatus comprises one or more light sources, at least one image acquisition device for acquiring images; and a device. The device comprises a processing unit, a memory coupled to the processing unit. The memory comprising a calibration module configured to obtain a value of current flowing through each of one or more light sources in real-time, compare the value of current flowing through each of the one or more light sources with a predefined threshold current value, and calibrate color gain value associated with at least one image acquisition device, if the determined value of current for each of the one or more light sources is above the predefined threshold current value.

14 Claims, 7 Drawing Sheets

(56) References Cited

U.S. PATENT DOCUMENTS

| | | | |
|---|---|---|---|
| 7,133,547 | B2 | 11/2006 | Marcelpoil et al. |
| 7,602,954 | B2 | 10/2009 | Marcelpoil et al. |
| 7,826,650 | B2 | 11/2010 | Marcelpoil et al. |
| 7,986,338 | B2 | 7/2011 | Ganser |
| 8,238,524 | B2 | 8/2012 | Aizaki et al. |
| 8,350,934 | B2 | 1/2013 | Chao et al. |
| 9,282,199 | B2 | 3/2016 | Hashizume |
| 9,568,432 | B2 | 2/2017 | Baxi et al. |
| 10,268,885 | B2 | 4/2019 | Kang et al. |
| 10,379,049 | B2 | 8/2019 | Hunter |
| 2001/0028391 | A1 | 10/2001 | Iko |
| 2004/0263678 | A1* | 12/2004 | Kawakami ............. H04N 23/88 348/371 |
| 2005/0018191 | A1 | 1/2005 | Luo |
| 2005/0046883 | A1 | 3/2005 | Chiba |
| 2007/0014000 | A1 | 1/2007 | Nolte et al. |
| 2009/0160833 | A1 | 6/2009 | Brown et al. |
| 2010/0239137 | A1 | 9/2010 | Pugia et al. |
| 2011/0190638 | A1 | 8/2011 | Devlin et al. |
| 2012/0013726 | A1 | 1/2012 | Thorburn |
| 2013/0044200 | A1 | 2/2013 | Brill et al. |
| 2015/0103401 | A1 | 4/2015 | Park et al. |
| 2015/0116561 | A1* | 4/2015 | Takei ..................... G03B 15/05 348/296 |
| 2015/0326839 | A1 | 11/2015 | Wengierow et al. |
| 2017/0048435 | A1* | 2/2017 | Oki ........................ H04N 23/56 |
| 2017/0264876 | A1 | 9/2017 | Gaiduk et al. |
| 2017/0343473 | A1 | 11/2017 | Cook |
| 2019/0094116 | A1 | 3/2019 | Cheng et al. |
| 2021/0195705 | A1* | 6/2021 | Derks .................... H05B 45/37 |

FOREIGN PATENT DOCUMENTS

| | | |
|---|---|---|
| EP | 1436577 A2 | 7/2004 |
| EP | 1470411 B1 | 10/2004 |
| EP | 1729162 A1 | 12/2006 |
| EP | 1933083 A1 | 6/2008 |
| EP | 2201373 A1 | 6/2010 |
| EP | 2204980 A1 | 7/2010 |
| EP | 2767216 A1 | 8/2014 |
| EP | 2986931 A1 | 2/2016 |
| EP | 3186673 A1 | 7/2017 |
| EP | 3201603 A1 | 8/2017 |
| EP | 3362782 A1 | 8/2018 |
| EP | 3397951 A1 | 11/2018 |
| JP | 2008145413 A | 6/2008 |
| JP | 2009212148 A | 9/2009 |
| JP | 2015021828 A | 2/2015 |
| JP | 2019113922 A | 7/2019 |
| WO | 2016013475 A1 | 1/2016 |
| WO | 2018027471 A1 | 2/2018 |
| WO | 2018207471 A1 | 11/2018 |

OTHER PUBLICATIONS

Charrière et al., "Color calibration of an RGB camera mounted in front of a microscope with strong color distortion", Applied Optics, Jul. 20, 2013, vol. 52, No. 21, pp. 5262-5271.

Zhang et al., "Color calibration and fusion of lens-free and mobile-phone microscopy images for high-resolution and accurate color reproduction", Jun. 10, 2016, Scientific Reports, 6, Article 27811, pp. 1-14.

R. Thakur et al., "Effect of smartphone camera settings in colorimetric measurements under controlled illumination," 14th International Congress on Image and Signal Processing, BioMedical Engineering and Informatics (CISP-BMEI), Shanghai, China, Oct. 23-25, 2021, pp. 1-4.

H. Yu et al., "A Method for Color Calibration Based on Simulated Annealing Optimization," Jul. 8-10, 2016 3rd International Conference on Information Science and Control Engineering (ICISCE), Beijing, China, 2016, pp. 54-58.

N.P. Kirillova, et al. "Calibration methods for measuring the color of moist soils with digital cameras", Catena, vol. 202, Mar. 15, 2021, pp. 1-11.

C. Grana et al., "Color calibration for a dermatological video camera system," Proceedings of the 17th International Conference on Pattern Recognition, Aug. 26, 2004. ICPR 2004., Cambridge, UK, pp. 798-801.

* cited by examiner

APPARATUS, METHOD FOR CALIBRATING AN APPARATUS AND DEVICE THEREFOR

This application claims benefit under 35 USC § 119(e) of U.S. Provisional Application No. 63/018,114, filed Apr. 30, 2020. The entire contents of the above-referenced patent application(s) are hereby expressly incorporated herein by reference.

FIELD OF TECHNOLOGY

The present disclosure relates to the field of analysis of a sample and more particularly to the field of calibrating an apparatus used in an analysis of a sample.

BACKGROUND

With the increased use of imaging-based diagnostic instruments and devices in the field of healthcare, the importance of accurate illumination and associated color of diagnostic samples have increased recently. Furthermore, balance in lighting and color is even more crucial in the areas of colorimetric assay and photometric analysis of analytes pertaining to patients. The color of the acquired images from the assays is directly involved in result interpretation. It is of utmost importance to obtain accurate diagnosis results, as discrepancies in results may lead to improper or delayed diagnosis of diseases, which may also be fatal in critical cases.

Analysis of such analytes may require uniform illumination and accurate color balance for accurate analysis of analytes and for providing reliable medical diagnosis results. Conventionally, the systems and methods known in the art solve problem of non-uniform illumination using image processing techniques, or photodiode-based illumination check that involves use of dedicated apparatuses and software for processing the acquired images to ensure uniform illumination. This may make the system bulky, inefficient, and may also involve increased power and processing speed requirements. Furthermore, conventional systems may require user intervention to balance color in an acquired image, which may lead to inaccuracies.

Therefore, the object of the disclosure is to provide an improved system for providing uniform illumination and accurate color balances for images acquired in imaging-based diagnostic instruments.

SUMMARY

In one aspect, the present disclosure provides a method for calibrating an apparatus. The method comprises obtaining a value of current flowing through each of one or more light sources in real-time. Herein, the apparatus comprises the one or more light sources. The method further comprises comparing the value of current flowing through each of the one or more light sources with a predefined threshold current value. The method further comprises calibrating color gain value associated with at least one image acquisition device, if the determined value of current for each of the one or more light sources is above the predefined threshold current value, wherein the apparatus comprises the at least one image acquisition device.

In one more embodiments, the method further comprises calibrating the color gain value associated with at least one image acquisition device by determining a color value pertaining to an image associated with at least one color checker card arranged in a region of interest. The method of calibrating the at least one image acquisition device further comprises comparing the determined color value with a known true color value pertaining to the at least one color checker card. The method of calibrating the at least one image acquisition device further comprises modifying the color gain value associated with the at least one image acquisition device, until the determined color value of the image matches with the known true color value.

In one or more embodiments, the method further comprises modulating the values of current flowing through one or more light sources, if the value of current flowing through any of the one or more light sources is below the predefined threshold current value.

In one or more embodiments, the method further comprises indicating a fault in the one or more light sources, if the value of any of the one or more light sources is below a predefined critical threshold current value. Herein, the predefined critical threshold current value is the current value below which the one or more light sources are non-functional.

In one or more embodiments, the method further comprises acquiring an image of the region of interest. The method further comprises determining a uniform illumination factor associated with the image of the region of interest. The method further comprises comparing the determined uniform illumination factor with a predefined threshold uniform illumination factor. The method further comprises modulating the value of current flowing through each of the one or more light sources to obtain a uniform illumination in the region of interest, if the determined uniformity illumination factor is below a predefined threshold uniformity illumination factor.

In one or more embodiments, the apparatus is an imaging based diagnostic instrument.

In another aspect, the present disclosure provides a device for calibrating an apparatus. The device comprises a processing unit and a memory coupled to the processing unit. The memory comprises a calibration module configured to obtain a value of current flowing through each of one or more light sources in real-time. Further, the calibration module is configured to compare the value of current flowing through each of the one or more light sources with a predefined threshold current value. Further, the calibration module is configured to calibrate color gain value associated with at least one image acquisition device, if the determined value of current for each of the one or more light sources is above the predefined threshold current value.

In one or more embodiments, the calibration module of the processing unit is further configured to determine a color value pertaining to an image associated with at least one color checker card arranged in a region of interest. Further, the configuration module is configured to compare the determined color value with a known true color value pertaining to the at least one color checker card. Further, the calibration module is configured to update the color gain value associated with the at least one image acquisition device, until the determined color value of the image matches with the known true color value.

In one or more embodiments, the calibration module of the processing unit is further configured to modulate the values of current flowing through the one or more light sources, if the value of current flowing through any of the one or more light sources is below the predefined threshold current value.

In one or more embodiments, the device further comprises controls configured to indicate a fault in the one or more light sources, if the value of any of the one or more light sources is below a predefined critical threshold current value. Herein, the predefined critical threshold current value is the current value below which the one or more light sources are non-functional.

In one or more embodiments, the calibration module of the processing device is further configured to acquire an image of the region of interest. Further, the calibration module is configured to determine a uniformity illumination factor associated with the image of the of the region of interest. Further, the calibration module is configured to compare the determined uniformity illumination factor with a predefined threshold uniformity illumination factor. Further, the calibration module is configured to modulate the value of current flowing through each of the one or more light sources to obtain a uniform illumination in the region of interest, if the determined uniformity illumination factor is below a predefined threshold uniformity illumination factor.

In yet another aspect, the present disclosure provides an apparatus comprising one or more light sources, at least one image acquisition device for acquiring images, and a device. Herein, the device comprises a processing unit and a memory coupled to the processing unit. The memory comprises a calibration module configured to obtain a value of current flowing through each of one or more light sources in real-time. Further, the calibration module is configured to compare the value of current flowing through each of the one or more light sources with a predefined threshold current value. Further, the calibration module is configured to calibrate color gain value associated with at least one image acquisition device, if the determined value of current for each of the one or more light sources is above the predefined threshold current value.

In yet another aspect, the present disclosure also provides a computer-program product having machine-readable instructions stored therein, which when executed by one or more processing units, cause the processing units to perform a method as discussed hereinabove.

This summary is provided to introduce a selection of concepts in a simplified form that are further described below in the following description. It is not intended to identify features or essential features of the claimed subject matter. Furthermore, the claimed subject matter is not limited to implementations that solve any or all disadvantages noted in any part of this disclosure.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

The present disclosure is further described hereinafter with reference to illustrated embodiments shown in the accompanying drawings, wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

Hereinafter, embodiments for carrying out the present disclosure are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details. In other instances, well known materials or methods have not been described in detail in order to avoid unnecessarily obscuring embodiments of the present disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the present disclosure.

In overview, the embodiments of the present disclosure are concerned with a method for calibrating an apparatus. Furthermore, the present disclosure also provides a device for calibrating an apparatus. Moreover, the present disclosure also provides an apparatus.

Figure 1:
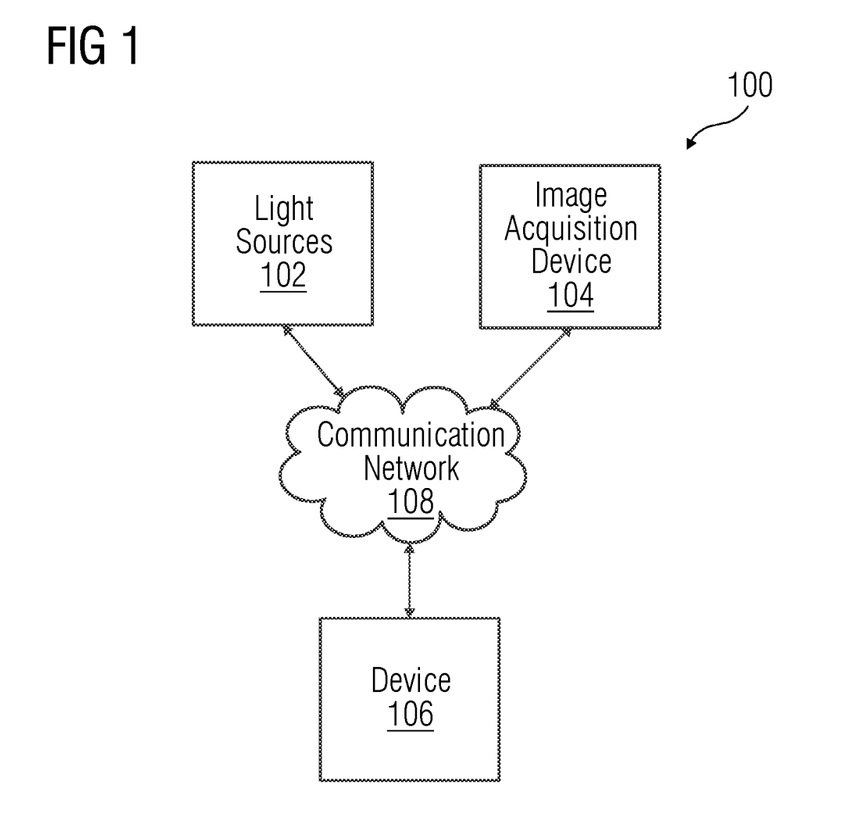
FIG. 1 is an illustration of block diagram of an apparatus, in accordance with an embodiment of the present disclosure.

Referring to FIG. 1, there is shown an illustration of a block diagram of an apparatus 100, in accordance with an embodiment of the present disclosure. As shown, the apparatus 100 comprises one or more light sources 102, at least one image acquisition device 104, and a device 106 communicatively coupled to the one or more light sources 102 and the at least one image acquisition device 104 via a communication network 108.

It will be appreciated that FIG. 1 is merely an example, which should not unduly limit the scope of the claims herein. It is to be understood that the specific designation for the apparatus 100 is provided as an example and is not to be construed as limiting the apparatus 100 to specific numbers, types, or arrangements of light sources (such as the one or more light sources 102), image acquisition devices (such as the at least one image acquisition device 104), and devices (such as the device 106), servers, networks, and so forth.

Throughout the present disclosure, the term "apparatus" 100 as used herein refers to a structure and/or arrangement of one or more elements that include programmable and/or non-programmable components configured to acquire, store, and process images from an environment. Optionally, the apparatus 100 includes any arrangement of physical or virtual computational entities capable of acquiring images and processing the same to derive relevant information. Notably, the device 106 is configured to calibrate the apparatus 100 to provide uniform illumination and optimum color balance in order to ensure acquisition of a true image of one or more objects in an environment. In an embodiment, the apparatus 100 is an imaging based diagnostic instrument. Herein, the device 106 is configured to calibrate the apparatus 100 to provide proper illumination and optimum color gains of the acquired image of one or more analytes such as body fluids for colorimetric analysis, spectroscopic analysis, fluorimetry analysis, phosphorescence analysis or chromatographic analysis. Such analysis thereby is used for determining accurate diagnostic results as obtained therefrom. In particular, body fluids such as urine, blood, stool suspended liquids, sweat, saliva, genital secretions or any other excretions can be analyzed using the apparatus 100. For this purpose, test strips or reagent carriers wetted with one or more body fluids can be placed in a dedicated place in the apparatus 100 and changes in one or more test fields can be optically detected to obtain diagnostic results, such as concentration of certain analytes such as blood, erythrocytes, hemoglobin, glucose, ketone body, ascorbic acid, protein, leukocytes, nitrite, pH, values in a sample.

It will be appreciated that hereinafter the embodiments of the present disclosure are explained with respect to imaging based diagnostic instruments. However, the findings of the present disclosure are not limited to imaging based diagnostic instruments only. Notably, the device 106 may be implemented in any apparatus comprising light sources and image acquisition devices that are used to acquire images from an environment and require uniform illumination and optimum color balance, such as in the field of photometric analysis of chemical substances, photography and cinematography, object detection systems, and the like. Furthermore, applications for the present disclosure are vast and include any application in which digital imaging and/or processing is involved. Techniques of this disclosure are particularly well-suited for calibration of certain devices for uniform illumination and optimal color balance. Embodiments may be applied to digital imaging adapted for use not only in personal and/or professional photography and videography, but also in medical, astronomy, physics, military, and engineering applications.

Throughout the present disclosure, the term "light sources" 102 as used herein refer to any electrical device capable of receiving an electrical signal and producing electromagnetic radiation or light in response to the signal. The light sources 102 may be configured to generate electromagnetic radiation within the visible spectrum, outside the visible spectrum, or a combination of both. The term "light" is used when the electromagnetic radiation is within the visible ranges of frequency and the term "radiation" is used when the electromagnetic radiation is outside the visible ranges of frequency.

The light sources 102 may be particularly configured to generate radiation or light having a sufficient intensity to effectively illuminate an interior or exterior environment or targeted area. In this context, "sufficient intensity" refers to sufficient radiant power in the visible spectrum generated in the space or environment. The unit "lumens" may be employed to represent the total light output from the light source 102 in all directions, in terms of radiant power or luminous flux. The light sources 102 may use lights of any one or more of a variety of radiating sources, including, but not limited to, Light Emitting Diode LED-based sources (including one or more LEDs), electroluminescent strips, incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources such as, photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

Notably, the one or more light sources 102, provide uniform illumination in a region of interest. Herein the term "region of interest" refers to an area in and around an object of interest, such as an area where samples or analytes to be analyzed are placed that is required to be uniformly illuminated to obtain accurate results. In one example, the one or more light sources 102 may be integrated within the apparatus 100 being calibrated. In another example, the one or more light sources are arranged in an environment and are communicatively coupled to the apparatus 100.

Throughout the present disclosure, the term "image acquisition device" 104 as used herein refers to an electronic device and/or an optical device configured to acquire images of an object. Herein, the image acquisition devices 104 refer to scanning devices that produce digital data in the form of a three-dimensional image or a two-dimensional image representing an object or a scene in a real-world environment. The "image acquisition devices" 104 may refer to a collection of one or more programmable and/or non-programmable components that are configured to capture data describing one or more features of a real-world object, for example, one or more intensity or colour values of an assay for colorimetric analysis. Optionally, the image acquisition device 104 is any one of: a camera, a rotatable camera, an infra-red camera and an optical camera. In one or more examples, the image acquisition devices 104 may also include other data acquisition devices that include, but are not limited to, one or more of a LiDAR (Light Detection and Ranging), a RADAR (Radio Detection and Ranging), 3D Scanner (Three-dimensional Scanner).

Throughout the present disclosure, the term "communication network" 108 as used herein refers to an arrangement of interconnected programmable and/or non-programmable components that are configured to facilitate data communication between one or more electronic devices and/or databases, whether available or known at the time of filing or as later developed. Furthermore, the network may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the network includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed. The apparatus 100 may be implemented using TCP/IP communications protocols IPX, AppleTalk, IP-6, NetBIOS, OSI, any tunneling protocol (e.g. IPsec, SSH), or any number of existing or future protocols.

In one embodiment, the device 106 is deployed in a cloud computing environment. As used herein, "cloud computing environment" refers to a processing environment comprising configurable computing physical and logical resources, for example, networks, servers, storage, applications, services, etc., and data distributed over the communication network 108, for example, the internet. The cloud computing environment provides on-demand network access to a shared pool of the configurable computing physical and logical resources.

Figure 2:
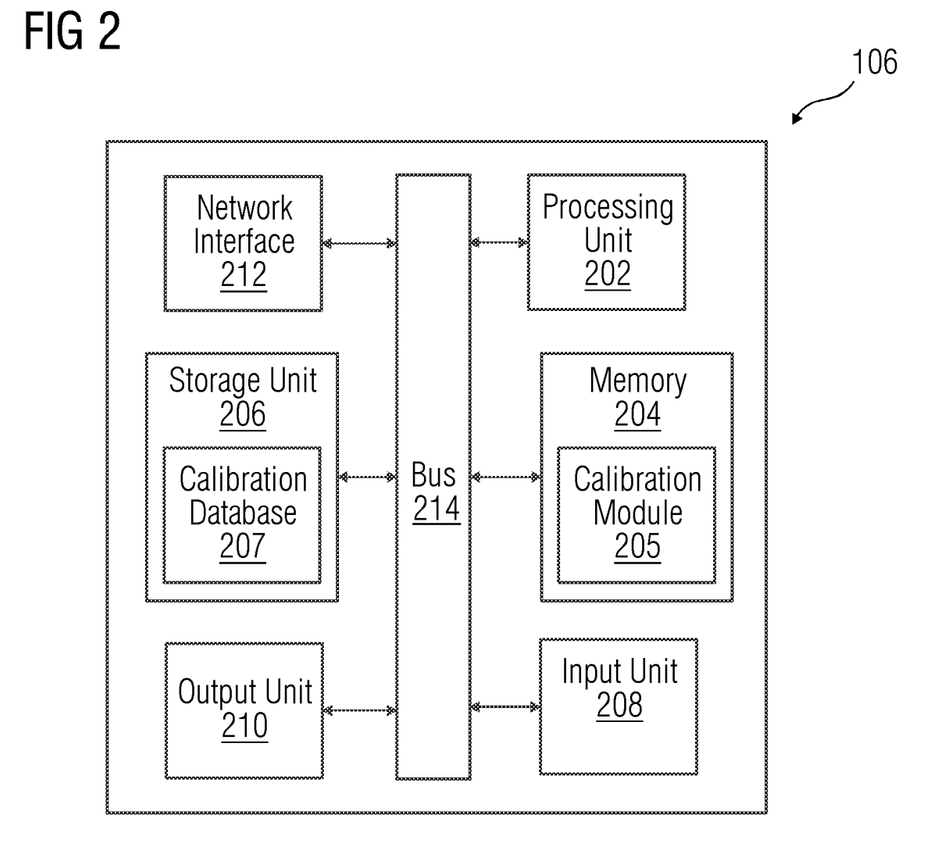
FIG. 2 is an illustration of a block diagram of a device as employed in the apparatus of FIG. 1, in accordance with an embodiment of the present disclosure.

Referring to FIG. 2, is a block diagram of a device 106 in which an embodiment can be implemented, for example, as a device to calibrate an apparatus, configured to perform the processes as described therein. It is appreciated that the device 106 is an exemplary implementation of the system in FIG. 2. In FIG. 2, the device 106 comprises a processing unit 202, a memory 204, a storage unit 206, an input unit 208, an output unit 210 a network interface 212 and a standard interface or bus 214. The device 106 can be a (personal) computer, a workstation, a virtual machine running on host hardware, a microcontroller, or an integrated circuit. As an alternative, the device 106 can be a real or a virtual group of computers (the technical term for a real group of computers is "cluster", the technical term for a virtual group of computers is "cloud"). Herein, the memory 204 comprises a calibration module 205 and the storage unit 206 comprises a calibration database 207. As aforementioned, the device 106 is communicatively coupled to the one or more light sources 102 and the at least one image acquisition device 104. Notably, the device 106 is configured to communicate with the light sources 102 and the image acquisition device 104 in several ways. In an example, the device 106 is monolithically integrated with the one or more light sources 102 and the at least one image acquisition device 104 to constitute the apparatus 100. In such a case, the apparatus 100 may be designed in a manner to perform all the functions and operations of the device 106. In another example, the device 106 is connected to the one or more light sources 102 and the at least one image acquisition device 104 via wired medium such as through cables, optical cables, or any other data transfer medium configured to establish a connection between the device and the one or more light sources 102 and the at least one image acquisition device 104. In yet another example, the device 106 is configured to wirelessly communicate with the one or more light sources 102 and the at least one image acquisition device 104 via a communication network 108 to calibrate the one or more light sources 102 and the at least one image acquisition device 104. Furthermore, optionally, the device 106 is configured to be communicatively coupled to a plurality of image acquisition devices 104 and light sources 102 at the same time for calibration therefor.

Throughout the present disclosure, the term "processing unit" 202 as used herein refers to any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 202 may also include embedded controllers, such as generic or programmable logic devices or arrays, application specific integrated circuits, single-chip computers, and the like. A processing unit 202 can comprise hardware elements and software elements. The processing unit 202 can be configured for multithreading, e.g., the processing unit 202 can host different calculation processes at the same time, executing the either in parallel or switching between active and passive calculation processes.

Throughout the present disclosure, the term "memory" 204 as used herein refers to as used herein refers to any physical device or hardware component capable of storing information temporarily and/or permanently. The memory 204 may be volatile memory and non-volatile memory. The memory 204 may be coupled for communication with the processing unit 202. The processing unit 202 may execute instructions and/or code stored in the memory 204. A variety of computer-readable storage media may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. Pursuant to present embodiments, the memory 204 includes a calibration module 205 stored in the form of machine-readable instructions on any of the above-mentioned storage media and may be in communication to and executed by processing unit 202. When executed by the processing unit 202, the calibration module 205 causes the processing unit 202 to provide uniform illumination and optimum color balance in the environment. Method steps executed by the processing unit 202 to achieve the abovementioned functionality are elaborated upon in detail in FIGS. 3A-3B, 5 and 6.

Throughout the present disclosure, the term "storage unit" 203 may be a non-transitory storage medium which stores a calibration database 207. The calibration database 207 is a repository of intensity values, current values, current threshold values for each of the one or more light sources 102. The calibration database 207 may further include true image color values, color gain values for a particular illumination and so forth. The input unit 208 may include input means such as keypad, touch-sensitive display, camera, etc. capable of receiving input signal. The bus 207 acts as interconnect between the processing unit 201, the memory 202, the storage unit 206, the communication network 108 the input unit 208 and the output unit 210.

Those of ordinary skilled in the art will appreciate that the hardware depicted in FIG. 1 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter, network connectivity devices also may be used in addition or in place of the hardware depicted. The depicted example is provided for the purpose of explanation only and is not meant to imply architectural limitations with respect to the present disclosure.

A device 106 in accordance with an embodiment of the present disclosure, optionally includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Washington may be employed if suitably modified. The operating system is modified or created in accordance with the present disclosure as described.

The present disclosure is not limited to a particular computer system platform, processing unit, operating system, or network. One or more aspects of the present disclosure may be distributed among one or more computer systems, for example, servers configured to provide one or more services to one or more client computers, or to perform a complete task in a distributed system. For example, one or more aspects of the present disclosure may be performed on a client-server system that comprises components distributed among one or more server systems that perform multiple functions according to various embodiments. These components comprise, for example, executable, intermediate, or interpreted code, which communicate over a network using a communication protocol. The present disclosure is not limited to be executable on any particular device or group of devices, and is not limited to any particular distributed architecture, network, or communication protocol.

Disclosed embodiments provide devices, apparatuses and methods for calibrating an apparatus. In particular, the devices and methods are employed for calibrating an apparatus used in an imaging based diagnostic instrument.

Figure 3A:
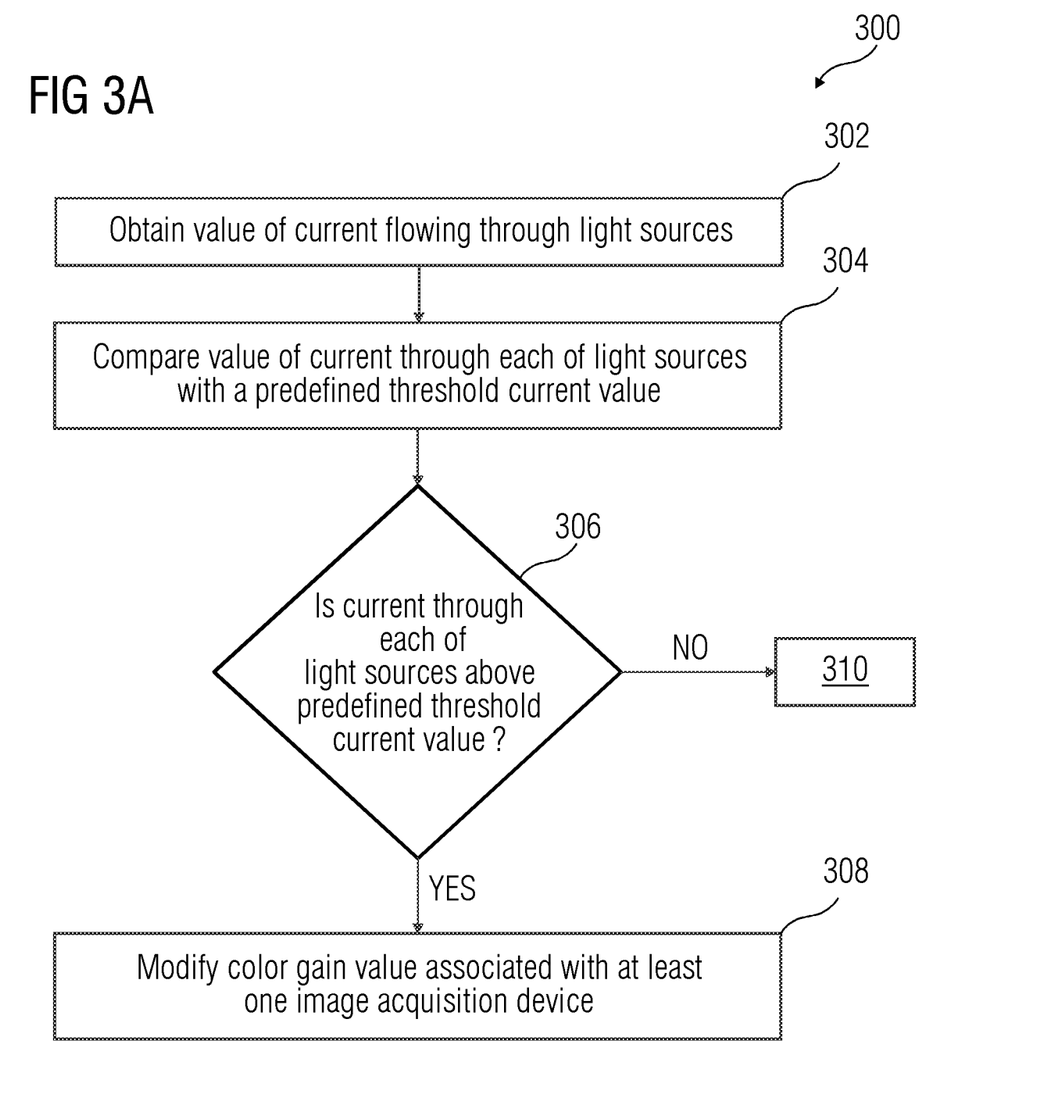
FIGS. 3A and 3B is an illustration of a flowchart of a method of calibrating an apparatus, in accordance with various embodiments of the present disclosure.

Referring to FIG. 3A, illustrated is a flowchart of a method 300 for calibrating an apparatus 100, in accordance with an embodiment of the present disclosure. At step 302, a value of current flowing through each of one or more light sources 102 is obtained in real-time. Herein, the value of output current in the one or more light sources 102 is measured in order to determine an intensity value of the one or more light sources 102. It will be appreciated that the intensity value is directly proportional to the value of current flowing through the light source 102. Therefore, determination of value of current flowing through the light source 102 aids in determining if the region of interest is uniformly illuminated. Herein, the value of current flowing through the one or more light sources 102 is measured by the processing unit 202 of the device 106. In an example, the processing unit 202 may include a dedicated controller for obtaining the value of current flowing through the one or more light sources 102. Such a dedicated controller is described in greater detail in FIG. 4.

Figure 4:
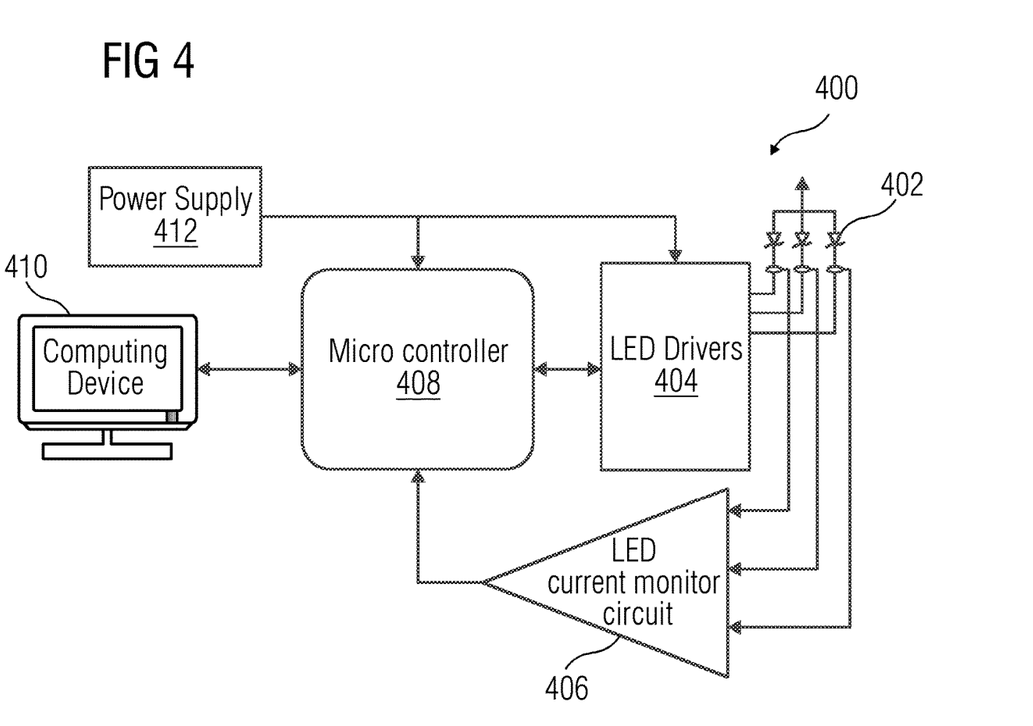
FIG. 4 is a schematic illustration of a controller employed in the calibration module of FIG. 2, in accordance with an embodiment of the present disclosure.

Referring to FIG. 4, there is shown a schematic illustration of a dedicated controller 400 for obtaining current values, in accordance with an embodiment of the present disclosure. As shown, the controller 400 comprises one or more light emitting diodes (LEDs) 402 (such as the one or more light sources 102 of FIG. 1), LED drivers 404, LED current monitor circuit 406, a microcontroller 408, a computing device 410 and a power supply 412. Throughout the present disclosure, the term "controller" 400 as used herein may refer to various apparatus or devices for processing the electrical signals and thereby controlling the operation of each of the one or more light emitting diodes (LEDs) 402 based on the electrical signals. Notably, the controller 400 is configured to regulate the magnitude of the electrical potential or current supplied to each of the one or more light emitting diodes (LEDs) 402. Furthermore, the change in the magnitude of the electrical potential leads to a change in intensity and/or spectrum of the light beams emitted from the one or more light emitting diodes (LEDs) 402. It will be appreciated that the controller 400 can be implemented in numerous ways. In an example, the controller 400 is a dedicated hardware to perform the functions discussed herein. In another example, the controller 400 can be one or more microprocessors that may be programmed using software (e.g., microcode) to perform various functions discussed herein. In another example, the dedicated controller 400 may be a pulse width modulator, pulse amplitude modulator, pulse displacement modulator, resistor ladder, current source, voltage source, voltage ladder, switch, transistor, voltage controller, or other controller. The dedicated controller 400 may regulate the current, voltage and/or power through the one or more light emitting diodes (LEDs) 402, in response to signals received. Furthermore, the dedicated controller 400 may be implemented with or without employing a processor, and also may be implemented as a combination of dedicated hardware to perform some functions and one or more programmed microprocessors along with an associated circuitry to perform other functions. Examples of dedicated controller 400 that may be employed in various embodiments of the present disclosure include, but are not limited to, conventional microprocessors, application specific integrated circuits (ASICs), and field-programmable gate arrays (FPGAs).

Herein, the LED drivers 404 are configured to adapted to be regulated based defined control currents to, thereby, control the electrical potential supplied to the associated one or more light source, such as LEDs 402. The term "driver" 404 as used herein refers to any discrete circuitry such as passive or active analog components including resistors, capacitors, inductors, transistors, operational amplifiers, and so forth, as well as discrete digital components such as logic components, shift registers, latches, or any other separately packaged chip or other component for realizing a digital signal. The driver 404 is regulated to control an electrical supply to each of the light sources, such as LEDs 402, in order to regulate the intensity and/or current values of the LED output. Notably, the LED drivers 404 act as in interface between the LEDs and rest of the control circuitry. Further, the LED current monitor circuit 406 is configured to measure an amount of voltage drawn by each of the one or more LEDs 402 by continuously measuring a value of resistance in associated circuitry. In an exemplary embodiment, the LED current monitor circuit 406 is an INA214AIDCKT current monitor IC used to convert the current flowing through each of the LEDs 402 into equivalent voltage. The value of current measured by the LED current monitor circuit 406 is read by the microcontroller 408 via an analog-to-digital converter port. The microcontroller 408 is configured to continuously read the voltage across resistor and take requisite action as necessary. Further, the microcontroller 408 is communicatively coupled to a computing device 410 to process the one or more signals as received in the microcontroller 408. Further, a power supply 412, say a DC power supply is provided to ensure a constant supply of electrical power to the entire dedicated controller 400.

Referring back to FIG. 3A, at step 304, the value of current through each of the one or more light sources is compared with a predefined threshold current value. Herein, the predefined threshold current value is a current value drawn by the one or more light sources, below which the apparatus 100 may produce inaccurate results and errors in determining a particular result. Furthermore, the predefined current value is the current value below which the apparatus 100 may be needed to be calibrated. Notably, the predefined threshold current value is defined at a time of manufacture of the apparatus 100 based on a functionality of the apparatus 100. Furthermore, the predefined threshold value is set at a particular default value based on a particular model of the one or more light sources 102. At step 306, a decision is made whether the current through each of the one or more light sources 102 is above the predefined threshold current value or below the predefined threshold current value. Herein, if the current through each of the one or more light sources 102 is above the predefined threshold current value, then path "YES" is followed and step 308 is executed. However, if the current through each of the one or more light sources 102 is below the predefined threshold current value, then path "NO" is followed and step 310 is executed thereafter. The step 310 is explained later in detail in conjunction with FIG. 3B.

At step 308, color gain value associated with the at least one image acquisition device 104 is modified, if the determined value of current for each of the one or more light sources 102 is above the predefined threshold current value. Throughout the present disclosure, the term "color gain value" as used herein refers to camera setting that controls amplification of an input signal from the image acquisition device 104. For example, in a case of RGB cameras, comprising three channels, say a RED channel, a GREEN channel, and a BLUE channel, a modulation of input signals to the RED channel, or the GREEN channel, or the BLUE channel or a combination thereof may be performed to perform white balance, which are the gain values that are applied to RED channel, or the GREEN channel, or the BLUE channel. Thus, by adjusting the color gain values, an attempt is made to make a white object appear white in the output of the camera. One of the ways to obtain a true image of an object in the region of interest is to be able to perform white balancing or color balancing by adjusting the color gain values. It will be appreciated that the color gain values are adjusted dynamically without any input from the user. In an example, for a given region of interest with sufficient amount of color variations, the average value of the red, green, and blue components of the image should average out to a common gray value (i.e., mean(red) components=mean (blue) components=mean(green) components). Thus, to adjust the white balance, a mean value of the green components, blue components and the red components in the scene are made equal, by adjusting the two parameters, red gain and blue gain. It will be appreciated that the image acquisition device 104 is calibrated to obtain a true image of a particular object of interest or region of interest by modifying the color gains of the image acquisition device 104. In an embodiment, the color gain value of the image acquisition device 104, say a camera associated with a colorimetry apparatus, is adjusted to determine a true image of a number of samples to be tested, so as to determine accurate results therefor. According to an embodiment, calibrating the color gain value associated with the at least one image acquisition device 104 comprises several steps as explained in FIG. 5.

Figure 5:
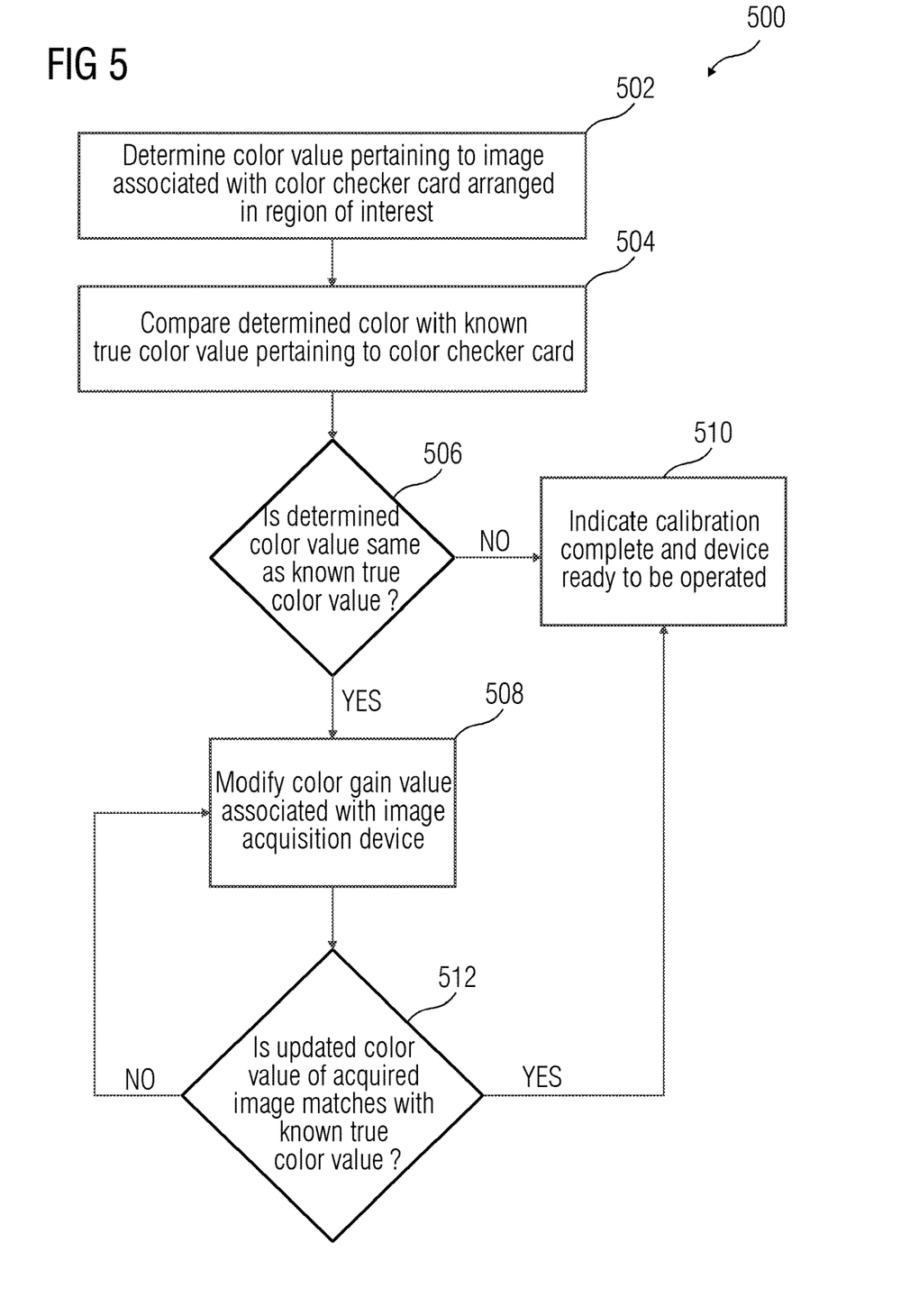
FIG. 5 is an illustration of a flowchart of a method for calibrating the color gain value associated with the at least one image acquisition device, in accordance with an embodiment of the present disclosure.

Referring to FIG. 5, illustrated is a flowchart depicting steps of a method 500 for calibrating the color gain value associated with the at least one image acquisition device 104, in accordance with an embodiment of the present disclosure. At step 502, a color value pertaining to an image associated with at least one color checker card arranged in the region of interest is determined. Throughout the present disclosure, the term "color checker card" as used herein refers to a cardboard-framed arrangement of a number of painted color samples that are used as a reference for color balancing the image associated with the region of interest. Notably, color checker cards may be of varied sizes depending on a number of colors. In an example, the color checker card comprises different color profiles that mimic colors of one or more real world objects. A region of interest or color targets such as the color checker card may be captured by cameras and other image acquisition devices, and the resulting images output may be compared to an original chart, to test a degree to which image acquisition devices approximate a human visual system. Furthermore, throughout the present disclosure, the term "color value" as used herein refers to one or more frequencies (or wavelengths) of radiation produced by the one or more light sources 102. Additionally, the term "colors" implicitly refers to multiple spectra having different wavelength components and/or bandwidths. It also should be appreciated that the term color may be used in connection with both white and non-white light.

Notably, the color checker card is arranged in the region of interest such that light from the image acquisition device 104 adequately illuminates the region of interest. As aforementioned, the "region of interest" refers to an area in and around an object of interest, such as an area where samples or analytes are placed that is required to be uniformly illuminated to obtain accurate results. Optionally, a number of color checker cards are placed in the region of interest. The number of color checker cards depend on an area of the region of interest, a position of the image acquisition device 104, an angle of the image acquisition device 104 and so forth. It will be appreciated that, herein, an image of a color checker card is obtained and a color value is obtained. For multiple, color checker cards placed in the region of interest, an average color value is obtained.

At step 504, the determined color value is compared with a known true color value pertaining to the at least one color checker card. It will be appreciated that a true color value for each of the colors in the color checker card is known and the color value determined from the image of the color checker card is compared to determine whether the known true color value matches with the determined color value. Further, for multiple color checker cards arranged in the region of interest, an average color value is calculated from each of individual color values of each of the multiple color checker cards. The average color value is then compared with an average known true color value.

At a step 506, a decision is made whether the determined color value matches with the known true color value pertaining to the at least one color checker card or not. Herein, if the determined color value does not match with the true color value, then path "NO" is followed and a step 510 is executed. Further, if the determined color value is matched with the true color value, then path "YES" is followed and a step 508 is executed, wherein the apparatus is indicated to be accurately calibrated and ready to be operated. At step 508, the color gain value associated with the at least one image acquisition device 104 is modified to match the determined color value of the image with the known true color value. Herein, the gain values of the image acquisition device 104 are dynamically modulated without any user intervention, to adjust the gain values to a level that the determined true color value matches with the known color values of the color checker card.

In an exemplary implementation, a particular number of color checker cards, say 7 color checker cards are placed close to the object whose image is to be acquired. It will be appreciated that the number 7 is not construed to be limiting in nature, and any number of color checker cards can be placed in the region of interest for reasons as mentioned above. The image acquisition device 104 acquired an image thereof, and a region of 8×8 pixels is selected within each color card, thereby resulting in 7 regions. Further, color values, say an average RGB value within each of the 7 regions are determined. Further, the determined 7 average color values are matched with known true color values of the color checker card and the procedure is repeated until the average color values are matched with the known true color values.

At step 512, a subsequent image is acquired with the updated color gains of the image acquisition device 104 and further the determined color value is compared with the known true color value to determine whether the determined color value matches with the known true color. In a case, when the determined color value does not match with the known true color value, then again step 508 is executed. In a case, when the determined color value matches with the known true color value, step 510 is executed. It will be appreciated that the method as described herein, provides effective digital color gains pre-processing prior to acquiring an image of the region of interest, that further aids in calibrating the image acquisition device 104 to obtain a true image of the region of interest. The disclosure may greatly increase image resolution and quality as well as reduce or eliminate post acquisition processing time and the necessity for complex post acquisition hardware and software.

Figure 3B:
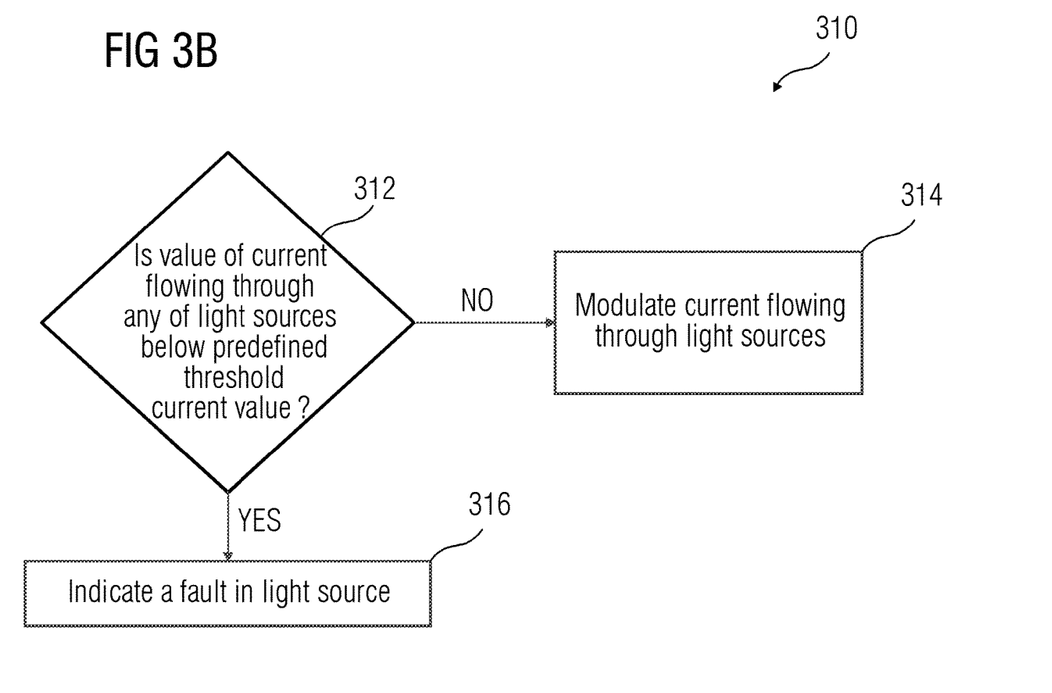

Referring to FIG. 3B, there is shown a flowchart depicting steps of a method 310 for conditions when the value of current through any of the one or more light sources 102 is below the predefined threshold current value, in accordance with an embodiment of the present disclosure. Notably, the step 312 is executed only when the value of current through the one or more light sources 102 is below the predefined threshold current value. At step 312, a comparison is made whether the value of current flowing through any of the one or more light sources 102 is below a predefined critical threshold current value or not. Herein, if the value of current flowing through any of the one or more light sources 102 is below the predefined critical threshold current value, then step 316 is executed. Further, if the value of current flowing through any of the one or more light sources 102 is above the predefined critical threshold current value, but below the predefined threshold current value, then step 314 is executed.

At step 314, the values of current flowing through one or more light sources 102 are modulated to attain an optimal output intensity of the one or more light sources 102. Notably, the values of current can be dynamically modulated via one or more drivers and microcontrollers associated with the one or more light sources 102. In an example, a value of resistance associated with the light sources 102 can be increased or decreased to increase or decrease the value of current flowing accordingly. Herein, the predefined critical threshold current value is the current value below which the one or more light sources 102 are non-functional. It will be appreciated that the predefined critical threshold current value is the current value below which the one or more light sources 102 cannot be repaired by simply changing current values. Optionally, the critical threshold value is defined at the time manufacture of the one or more light sources 102 designed for or employed in a particular apparatus 100. At step 316, a fault is indicated in the one or more light sources 102, if the value of any of the one or more light sources 102 is below a predefined critical threshold current value. Herein, according to an embodiment, the apparatus 100 may further comprise controls to indicate a fault in the one or more light sources 102. In an example, the control may be an LED installed on a housing of the apparatus, configured to be operated in an "ON" state when any of the light source 102 become non-functional. In another example, the control may be a siren or alarm configured to produce a sound when any of the light sources 102 become non-functional. Notably, indication of a fault further indicates that the apparatus 100 or the device 106 in use, is due for maintenance, such as replacement of one or more light sources 102. Such a methodology ensures that the apparatus 100 is not operated in a faulty state, thereby ensuring that no inaccurate results are generated therefrom.

Figure 6:
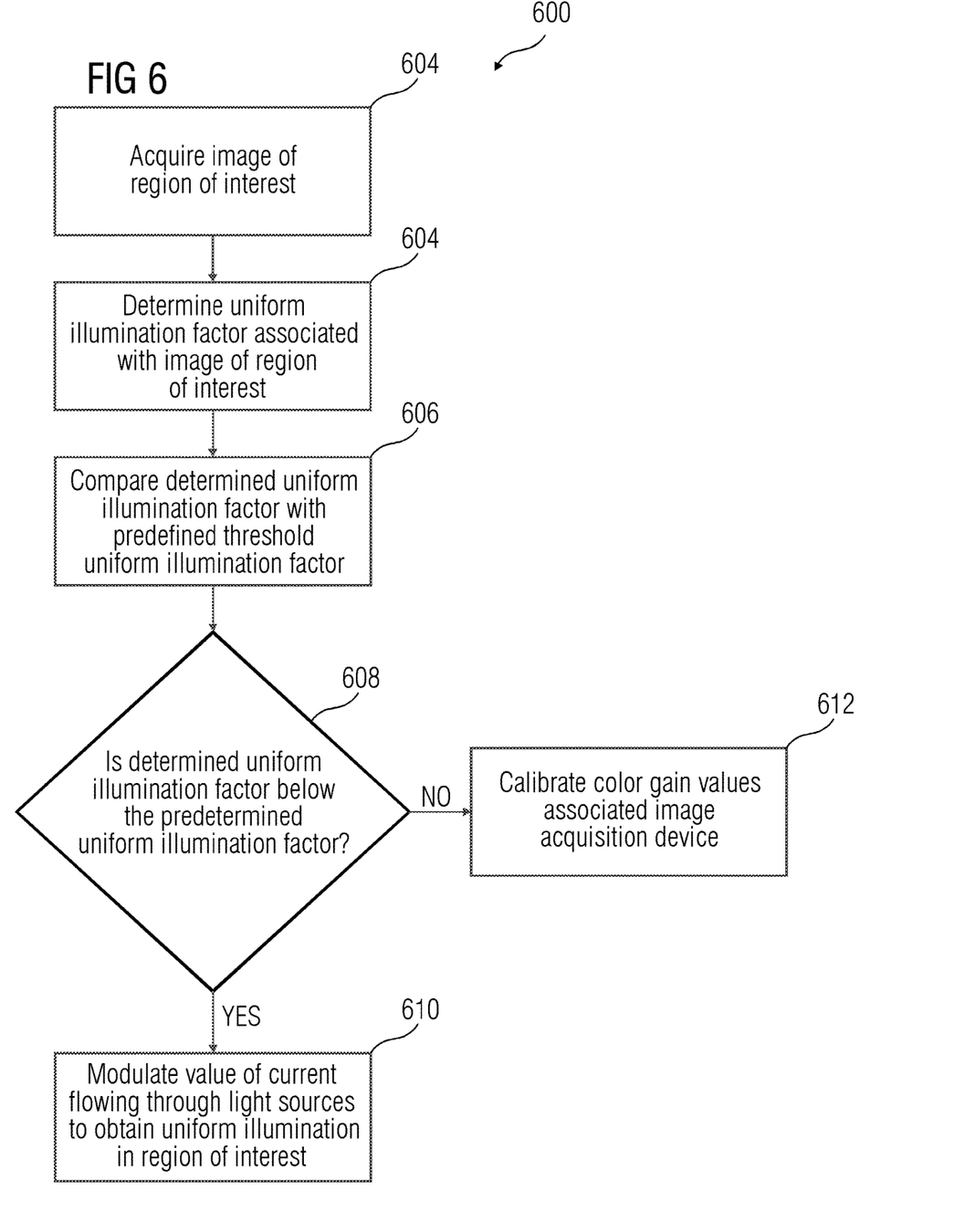
FIG. 6 is an illustration of a flowchart of a method for calibrating the image acquisition device, in accordance with another embodiment of the present disclosure.

Referring to FIG. 6, illustrated is a flowchart depicting steps of a method 600 for calibrating the at least one image acquisition device, in accordance with another embodiment of the present disclosure. At step 602, an image of the region of interest is acquired. As aforementioned the region of interest is an area which is to be properly illuminated. At step 604, a uniform illumination factor associated with the image of the of the region of interest is determined. Herein, the term "uniform illumination factor" refers to a quantitative value indicative of proper illumination in the region of interest. It will be appreciated that the uniform illumination factor is directly proportional to output intensity of the one or more light sources 102. An optimal uniform illumination factor ensures that light-dark patches of light that may arise due to non-uniform illumination are not present. At step 606, the determined uniform illumination factor is compared with a predefined threshold uniform illumination factor. At step 608, a decision is made whether the determined uniform illumination factor is below the predefined uniform illumination factor or not. Herein, path "YES" is followed when the determined uniform illumination factor is below the predefined uniform illumination factor, and step 610 is executed subsequently. Further, path "NO" is followed when the determined uniform illumination factor is above the predefined uniform illumination factor and step 612 is executed subsequently. At step 610, the value of current flowing through each of the one or more light sources 102 is modulated to obtain a uniform illumination in the region of interest, if the determined uniformity illumination factor is below a predefined threshold uniformity illumination factor. Herein, a current flowing through a particular light source 102 may be increased and current flowing through another light source 102 may be decreased in order to obtain uniform illumination. Optionally, as aforementioned the drivers 404 associated with the light sources 102 are configured to modulate the current values in order to obtain uniform illumination in the region of interest. At step 612, color gain values associated with the image acquisition device 104 are calibrated as discussed above.

Beneficially, the present disclosure provides a robust method and device for calibrating an apparatus. Furthermore, effective calibration of the apparatus mitigates any possibility of an error due to non-uniform illumination and color imbalance of images obtained in the region of interest. The calibration strategies as disclosed herein are executed in a defined order, e.g., first uniform illumination is ensured and then color balance is achieved, thereby eliminating dependency of calibration on other devices such as in the conventional systems. For example, if were to use camera (such as the image acquisition device 104) to check for non-uniformity, the results would be dependent on the camera calibration and errors associated with the camera. However, in the present disclosure, the uniform illumination is measured or detected without the camera, thereby eliminating the errors associated with the camera. Further, the color gain correction is performed only after the uniform illumination is ensured which eliminates the errors due to non-uniform illumination. Hence the disclosure improves the quality of the image acquired so that it is as close as it can be to the expected ideal image. Notably, such techniques avoid a time needed for pre-processing that may be required to adjust and enhance the image for image processing. The time and complexity required for pre-processing is reduced as the image acquired has uniform illumination and has adaptive RGB gains which ensures true color. Beneficially, such methods as described hereinabove reduce complexity and make the system robust inherently.

The foregoing examples have been provided merely for the purpose of explanation and are in no way to be construed as limiting of the present disclosure disclosed herein. While the disclosure has been described with reference to various embodiments, it is understood that the words, which have been used herein, are words of description and illustration, rather than words of limitation. Further, although the disclosure has been described herein with reference to particular means, materials, and embodiments, the disclosure is not intended to be limited to the particulars disclosed herein; rather, the disclosure extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosure in its aspects.

What is claimed is:

1. A method for calibrating an apparatus, the method comprising:
   obtaining a value of current flowing through each light source of one or more light sources in real-time, wherein the apparatus comprises the one or more light sources;
   comparing the value of current flowing through each light source of the one or more light sources with a predefined threshold current value; and
   calibrating color gain value associated with at least one image acquisition device, when the obtained value of current for each light source of the one or more light sources is above the predefined threshold current value, wherein the apparatus comprises the at least one image acquisition device.

2. The method according to claim 1, wherein the calibrating of the color gain value associated with at least one image acquisition device comprises:
   determining a color value pertaining to an image associated with at least one color checker card arranged in a region of interest;
   comparing the determined color value with a known true color value pertaining to the at least one color checker card; and
   modifying the color gain value associated with the at least one image acquisition device, until the determined color value of the image matches with the known true color value.

3. The method according to claim 1, further comprising:
   modulating the values of current flowing through the one or more light sources when the value of current flowing through any light source of the one or more light sources is below the predefined threshold current value.

4. The method according to claim 1, further comprising: indicating a fault in the one or more light sources when the value of current of any light source of the one or more light sources is below a predefined critical threshold current value,
   wherein the predefined critical threshold current value is a current value below which the one or more light sources are non-functional.

5. The method according to claim 1, further comprising:
   acquiring an image of the region of interest;
   determining a uniform illumination factor associated with the image of the of the region of interest;
   comparing the determined uniform illumination factor with a predefined threshold uniform illumination factor; and
   modulating the value of current flowing through each light source of the one or more light sources to obtain a uniform illumination in the region of interest when the determined uniformity illumination factor is below a predefined threshold uniformity illumination factor.

6. The method according to claim 1, wherein the apparatus is an imaging based diagnostic instrument.

7. A device for calibrating an apparatus, the device comprising:
   a processing unit;
   a memory coupled to the processing unit, the memory comprising a calibration module configured to:
      obtain a value of current flowing through each light source of one or more light sources in real-time;
      compare the value of current flowing through each light source of the one or more light sources with a predefined threshold current value; and
      calibrate color gain value associated with at least one image acquisition device when the obtained value of current for each light source of the one or more light sources is above the predefined threshold current value.

8. The device according to claim 7, wherein the calibration module is further configured to:
   determine a color value pertaining to an image associated with at least one color checker card arranged in a region of interest;
   compare the determined color value with a known true color value pertaining to the at least one color checker card; and
   update the color gain value associated with the at least one image acquisition device, until the determined color value of the image matches with the known true color value.

9. The device according to claim 7, wherein the calibration module is further configured to:
   modulate the values of current flowing through the one or more light sources when the value of current flowing through any light source of the one or more light sources is below the predefined threshold current value.

10. The device according to claim 7, further comprising:
    controls configured to indicate a fault in the one or more light sources when the value of current of any light source of the one or more light sources is below a predefined critical threshold current value, wherein the predefined critical threshold current value is the current value below which the one or more light sources are non-functional.

11. The device according to claim 7, wherein the calibration module is further configured to:
    acquire an image of the region of interest;
    determine a uniformity illumination factor associated with the image of the of the region of interest;

compare the determined uniformity illumination factor with a predefined threshold uniformity illumination factor; and modulate the value of current flowing through each light source of the one or more light sources to obtain a uniform illumination in the region of interest when the determined uniformity illumination factor is below a predefined threshold uniformity illumination factor.

12. The device according to claim 7, wherein the apparatus is an imaging based diagnostic instrument.

13. An apparatus comprising:
one or more light sources;
at least one image acquisition device for acquiring images; and
a device comprising:
  a processing unit;
    a memory coupled to the processing unit, the memory comprising a calibration module configured to:

obtain a value of current flowing through each light source of the one or more light sources in real-time;

compare the value of current flowing through each light source of the one or more light sources with a predefined threshold current value; and calibrate color gain value associated with at least one image acquisition device when the obtained value of current for each light source of the one or more light sources is above the predefined threshold current value.

14. A computer-program product having machine-readable instructions stored therein, which when executed by one or more processing units, cause the one or more processing units to perform a method according to claim 1.

* * * * *